United States Patent
Rowen

(10) Patent No.: US 7,331,400 B2
(45) Date of Patent: Feb. 19, 2008

(54) FIRE RESISTANT AND SMOKE SUPPRESSING COATINGS

(75) Inventor: John B. Rowen, Southborough, MA (US)

(73) Assignee: Avtec Industries, Inc., Hudson, MA (US)

( * ) Notice: Subject to any disclaimer, the term of this patent is extended or adjusted under 35 U.S.C. 154(b) by 0 days.

(21) Appl. No.: 11/198,343

(22) Filed: Aug. 4, 2005

(65) Prior Publication Data

US 2007/0284120 A1    Dec. 13, 2007

Related U.S. Application Data

(63) Continuation-in-part of application No. 10/912,265, filed on Aug. 5, 2004, now abandoned, which is a continuation-in-part of application No. 09/521,074, filed on Mar. 7, 2000, now Pat. No. 7,018,571.

(51) Int. Cl.
    *A62C 2/06* (2006.01)
    *C09K 21/04* (2006.01)
    *C09K 21/08* (2006.01)
    *C09K 5/18* (2006.01)

(52) U.S. Cl. .................. 169/45; 169/44; 252/602; 252/606; 252/609; 106/18.15; 106/18.16; 106/18.17; 106/18.18; 106/18.2; 106/18.21; 523/179; 524/115; 524/121

(58) Field of Classification Search ............... 252/609
See application file for complete search history.

(56) References Cited

U.S. PATENT DOCUMENTS

| | | |
|---|---|---|
| 3,293,327 A | 12/1966 | Hechenbleikner et al. |
| 3,513,114 A | 5/1970 | Hahn et al. |
| 3,562,197 A | 2/1971 | Sears et al. |
| 3,654,190 A | 4/1972 | Levin |
| 3,875,971 A | 4/1975 | Hamling |
| 3,914,193 A | 10/1975 | Fessler et al. |
| 3,969,291 A | 7/1976 | Fukuba et al. |
| 4,009,137 A | 2/1977 | Dany et al. |
| 4,166,743 A | 9/1979 | Wortmann et al. |
| 4,247,435 A | 1/1981 | Kasten |
| 4,743,625 A | 5/1988 | Vajs et al. |
| 4,801,625 A | 1/1989 | Parr et al. |
| 5,102,726 A | 4/1992 | Gabbay |
| 5,225,464 A | 7/1993 | Hill, Jr. |
| 5,356,568 A | 10/1994 | Levine |
| 5,400,830 A | 3/1995 | Stiles et al. |
| 5,618,865 A | 4/1997 | Matens et al. |
| 5,749,948 A | 5/1998 | Scholz et al. |
| 5,989,706 A | 11/1999 | McGinniss et al. |
| 6,001,437 A | 12/1999 | Thorpe et al. |
| 6,031,040 A | 2/2000 | Horacek |
| 6,054,513 A | 4/2000 | Pirig et al. |
| 6,084,008 A | 7/2000 | Liu |
| 6,096,812 A | 8/2000 | Hanfin et al. |
| 6,153,674 A | 11/2000 | Landin |
| 6,205,728 B1 | 3/2001 | Sutelan |
| 6,228,914 B1 | 5/2001 | Ford et al. |
| 6,338,366 B1 | 1/2002 | Williams |
| 6,340,645 B1 | 1/2002 | Horacek et al. |
| 6,930,138 B2 * | 8/2005 | Schell et al. ............... 524/145 |
| 7,018,571 B1 * | 3/2006 | Camarota et al. ........... 252/606 |
| 7,045,080 B1 * | 5/2006 | Youngs ..................... 252/606 |
| 2004/0054035 A1 | 3/2004 | Hallissy et al. |
| 2004/0110870 A1 | 6/2004 | Liu |
| 2004/0226100 A1 | 11/2004 | Small, Jr. et al. |
| 2004/0266294 A1 | 12/2004 | Rowen |
| 2005/0009965 A1 | 1/2005 | Schell et al. |
| 2005/0009966 A1 | 1/2005 | Rowen |
| 2005/0288421 A1 * | 12/2005 | Burns et al. ............... 524/464 |

* cited by examiner

*Primary Examiner*—Joseph D. Anthony
(74) *Attorney, Agent, or Firm*—Deborah A. Peacock; Philip D. Askenazy; Peacock Myers, P.C.

(57) ABSTRACT

A surface coating includes fire retarding and smoke suppressing constituents dispersed throughout an essentially non-toxic, water-based adhesive binder. The coating comprises a mixture of chemical compounds where each constituent falls into one of six functional groups, being: 1) catalyst/initiator; 2) expandable graphite; 3) carbonific, or source of carbon which additionally forms water; 4) blowing agent (a source of non-flammable gases); 5) cement; and, 6) ceramic.

14 Claims, No Drawings

FIRE RESISTANT AND SMOKE SUPPRESSING COATINGS

CROSS-REFERENCE TO RELATED APPLICATIONS

This application is a continuation-in-part application of U.S. patent application Ser. No. 10/912,265 entitled, "Aqueous Fire Resistant and Smoke Suppressing Surface Coatings," filed on Aug. 5, 2004, now abandoned, which is a continuation-in-part application of U.S. patent application Ser. No. 09/521,074, entitled "Flame Retardant and Smoke Suppressive Additive Powder for Polymeric Thermoplastics and Thermoset Resins", filed on Mar. 7, 2000, now issued as U.S. Pat. No. 7,018,571. This application is also related to U.S. application Ser. No. 10/912,264, filed on Aug. 5, 2004, entitled "Flame Retardant and Smoke Suppressive Thermoset Resins", now issued as U.S. Pat. No. 6,930,136, which is a division of U.S. patent application Ser. No. 09/521,074 (described above). The specification and claims of all these applications are incorporated herein by reference.

BACKGROUND OF THE INVENTION

Field of the Invention (Technical Field)

This invention relates generally to non-toxic flame retardant and smoke suppressive compositions, and more particularly to coatings.

Commodity construction materials and structural components are cost effective and exhibit acceptable building component properties. However, upon exposure to open flame or high radiant heat, many common building materials exhibit troublesome properties that are inherent with regard to surface flammability, smoke generation and toxicity (FST). Those properties are often subject to prescribed regulatory performance criteria by fire code regulating authorities, particularly when those construction components are to be used in an enclosed environment.

Due to a greater awareness of the destructive and life threatening consequences of structures that were not designed to address stringent fire safety standards, recommendations by the top engineers in the United States will alter the way buildings are designed and what materials are used. The call for improved fire safety standards is under investigation by agencies such as the National Institute of Standards and Technology, i.e., NIST. Federal recommendations after disasters have traditionally resulted in substantial changes to safety codes enacted by state and local governments from New York to California. For example, after the San Fernando earthquake in 1971, many western states adopted a uniform building code to make buildings more resistant to quake damage. In view of the tragic consequences that befell the World Trade Center in September of 2001, new interest in passive fireproof, fire retardant and smoke suppressive coating technology is at the crux of the call for new safety standards and building codes.

Commercially available for decades, insulative and fire resistant coatings have been applied to building materials with menacing and troublesome problems when exposed to open flame or high radiant heat. For instance, nearly all fireproofing in modern steel-reinforced buildings is a mixture of mineral fibers, concrete-like materials called binders and water. The mixture is sprayed onto columns and beams, where it dries and sticks. If a fire breaks out, in theory, the fireproofing insulates the structural steel to prevent it from heating to the point at which it becomes soft and unable to bear a load. As evidenced by the swift World Trade Center collapse, its brittle nature and low adhesive properties demonstrate it is inadequate for secure fire safety engineering practices. Another example of a fireproof coating in widespread use is solvent-based intumescent coatings. Those solvent-based coatings have numerous coating binders varying from simple elastomeric rubber adhesives to sophisticated two-part thermoset resin binders. Although most have satisfactory adhesion for general industrial use, they vary dramatically in fireproofing and smoke suppression characteristics. These characteristics, or properties, are surface flammability and flame spread; smoke generation and obscuration characteristics; and, the toxicity of the combustion products generated by pyrolysing polymer binders and brominated polymeric fire retardants. Solvents required for processing of these coatings are typically toluene, methyl ethyl ketone, xylene, styrene, methyl methacrylate or acetone, or a combination thereof. Environmental and health safety code governing authorities are increasingly limiting the quantity of such hazardous airborne pollutants permitted for both liberation into the environment and exposure times for end users and applicators.

U.S. Pat. No. 3,293,327 describes the production of bicyclic phosphites, phosphonates, thiophosphates, and selenophosphates. Those compositions are said to be stabilizers for vinyl halide resins, and are said to be useful as heat stabilizers for vinyl chloride resin, and as antioxidants for fats and oils.

Intumescent, fire-retardant coating compositions containing carbonifics, film-forming binders and phosphorous materials are well known in the art. U.S. Pat. Nos. 3,562,197; 3,513,114; 4,009,137; 4,166,743 and 4,247,435 disclose such compositions containing ammonium polyphosphates as the phosphorous containing material.

U.S. Pat. No. 3,654,190 discloses an intumescent paint comprising a resinous binder, a blowing agent, a phosphorous containing material, a source of chlorine a solvent, an anti-settling agent, a pigment and a surfactant.

U.S. Pat. No. 3,969,291 describes the use of an amide polyphosphate condensate as a fire-retardant additive in an intumescent coating composition. U.S. Pat. No. 3,914,193 discloses the similar use of a crystalline form of melamine pyrophosphate.

U.S. Pat. No. 4,801,625 describes a flame resistant composition having (1) an organic polymeric substance in intimate contact with (2) a bicyclic phosphorous compound, and (3) a gas producing compound. The patent is silent on the use of bicyclic compounds to attain smoke suppressed flame retardant thermoset compositions.

U.S. Pat. No. 5,356,568 describes a solvent-based heat-resistant and fire-retardant coating containing carbonifics, film-forming binders, and phosphorous materials. Also described is an application where the coating is sprayed on steel and aluminum plates using a gravity flow gun. Not described are any smoke retardant properties, nor the use of the coating with resins or polymer plastics.

Historically, fire retardant and fireproof coatings have been found to exhibit undesirable characteristics that can lead to a multitude of problems, i.e., brittleness; poor adhesion; egregious smoke generation; biologically toxic species of thermoset resin combustion byproducts such as brominated compounds and suspect carcinogens.

Therefore, it is desired to provide a non-toxic additive composition and an adhesive binder. More particularly, for the reasons stated above, it is specifically desired to provide a composition and method of the present invention that does not include any of the following classes of compounds:

Brominated compounds, including decabromodiphenyl ether (DBPE, Deca-BDE), octabromodiphenyl ether (Octa-BDE), pentabromophenyl ether (Penta-BDE), hexabromocyclododecane (HBCD), decadbromobiphenyl ether (DeBBE) as well as other polybrominated biphenyls (PBB), tetrabromo phthalic anhydride and all related aliphatic and aromatic brominated compounds; and heavy metals or metallic compounds such as the bromine synergist antimony trihydroxide (ATO).

For the purpose of the present invention, any prior-art article of manufacture containing any compounds in any of the above classes are considered irrelevant as they yield products with undesirable physical and flame-retardant characteristics that are inconsistent with current building and life safety regulatory standards, and are physiologically toxic.

SUMMARY OF THE INVENTION

The invention provides a surface coating having fire retarding and smoke suppressing constituents dispersed throughout an essentially non-toxic, water-based adhesive binder. In this novel composition, the coating includes an additive powder that is a mixture of chemical compounds dispersed in the binder where each constituent falls into one of six functional groups, being: 1) catalyst/initiator; 2) expandable graphite; 3) carbonific, or source of carbon which additionally forms water; 4) blowing agent (a source of non-flammable gases); 5) cement; and, 6) ceramic.

The present invention relates to a composition and method for providing a fire resistant and smoke suppressing coating. The coating preferably comprises an active mixture comprising an essentially non-toxic fire retardant and smoke suppressing composition comprising a cementitious constituent and an essentially non-toxic binder. The active mixture has a latent ability to intumesce or expand when a specific temperature is reached.

The preferred embodiment of the coating comprises a catalyst comprising a phosphate material; exfoliating graphite; a carbonific; a blowing agent; a ceramic material preferably comprising spheres; a halogen; and a cementitious material, preferably comprising calcium aluminate or optionally comprising silica flour.

The preferred embodiment of the coating does not contain brominated compounds, heavy metal compounds, essentially no volatile organic compounds and virtually no hazardous air pollutants.

The fire resistant and smoke suppressing coating is preferably foamed prior to application and is wettable and coatable on glass rovings, fabrics, and fibers.

The fire resistant and smoke suppressing coating preferably comprises a binder that is thermosetting, such as an epoxide polymer or a urethane polymer. The coating alternately comprises a binder that is thermoplastic that is preferably cast or extruded preferably in a film.

The fire resistant and smoke suppressing coating comprises a binder that is preferably adhesive, preferably comprising a colloidal dispersion or an acrylic polymer.

The preferred method of the invention is described below.

The active coating retards fire and suppresses smoke by reacting to fire or radiant heat. The coating intumesces and expands to a fire retarding and smoke suppressing char. The cementitious constituent adds rigidity and strength to the expanded char, reflects infrared radiances, and suppresses smoke and afterglow. The catalyst releases a by-product and dehydrates the binder when the coating reacts to fire or radiant heat. Furthermore, the catalyst by-product reacts with the carbonific to form a catalyzed carbonific. The catalyzed carbonific decomposes and forms a carbonaceous structure within the char layer and produces fire snuffing compounds. The catalyst by-product regenerates and repeats these steps. The blowing agent decomposes and yields non-flammable gases and additional char. The char layer grows larger in volume forming a swollen insulative heat shield. The ceramic insulates the substrate from heat, absorbs infrared radiances, reradiates the infrared from the coating by emissivity, and keeps higher temperatures and high velocity pressure gradients from penetrating into the substrate. The graphite expands, increasing the char volume.

DETAILED DESCRIPTION OF THE PREFERRED EMBODIMENTS

The invention provides a fire-retardant and smoke-suppressing coating. This novel composition includes an essentially non-toxic fire retardant and smoke-suppressing composition comprised with a binder. The term "nontoxic" and "essentially non-toxic," as used throughout the specification and claims, is intended to mean that the composition, coating or binder does not have toxic levels as defined by governmental regulatory authorities, such as the U.S. Environmental Protection Agency. The preferred fire-retardant and smoke suppressing composition comprises an additive powder that is mixed with curable or hardenable resins, polymeric film forming plastics, and other thermally oxidizable petrochemical based compounds and derivatives. The powder or composition preferably includes a carbonific material, a blowing agent (preferably a heat activated blowing agent), a carbonic material (preferably a heat activated carbonic material), a catalyst (preferably a phosphate material), and a cementitious constituent.

The term "carbonific" as used throughout the specification and claims, is intended to mean any source of carbon that contributes to the "char". The term "blowing agent," as used throughout the specification and claims, is intended to mean any source of non-flammable gases. The terms "cementitious constituent" or "cementitious compound" as used throughout the specification and claims, is intended to mean a heat resistant material that reacts in the presence of water vapor or steam, proceeds through a hydration reaction, and imparts a cementitious (e.g. cement) characteristic to the coating as the surface swells.

The additive powder or composition, when combined with a film forming curable or hardenable adhesive binder, forms a mixture where the additive powder is preferably about 20-90%, by dry or cured weight, of the mixture. The binder preferably includes, but is not limited to materials that are styrenic, olefinic, acrylic, cellulosic, polyester, epoxide, urethane or polyamide such as are commonly used in the manufacture of fiberglass reinforced structures and moldable plastics.

This new coating contains virtually no volatile organic compounds (VOCs) or hazardous air pollutants (HAPs). The terms "virtually no volatile organic compounds" and "virtually no hazardous air pollutants (HAPs)," "no VOCs," "no HAPs," or variations on such terms, are similarly intended to mean that the composition, coating or binder does not have or does not contain the levels so as to categorize them as volatile organic compounds or hazardous air pollutants. For instance, the EPA has a limit of 0 to less than 250 grams per liter of certain VOCs, and at this level can be considered "virtually no VOC".

The powdered composition according to the invention is "active." By term "active," as used throughout the specification and claims, means that the composition has a latent ability to intumesce or foam when a specific temperature is reached. This is due to the nature of a blowing agent, which is a part of the composition. In a preferred embodiment, that temperature of flame or heat retardation is 350 degrees Centigrade. At this temperature and above, the cured or hardened resin/composite structure resists combustion, self-extinguishes without the direct application of a flame extinguisher, and produces a substantially smaller quantity of less-toxic smoke than similar prior-art materials.

In a preferred embodiment of the invention, the composition, preferably an additive powder, by weight % of ingredient class, is as follows.

| Ingredient Class | Wt. % Range |
|---|---|
| a) catalyst | 30.0 to 41.0 |
| b) carbonific | 22.0 to 29.0 |
| c) blowing agent | 15.5 to 17.5 |
| d) cementitious constituent | 21.0 to 25.0 |
| e) ceramic | 2.50 to 5.00 |

The ingredients of the additive powder composition preferably are mixed and blended at preferably ambient (room) temperature until fully incorporated into a uniform, homogeneous composition. The additive in its final form is preferably a white fine powder that can be added to an adhesive binder, as well as mixed with additional chemical constituents.

Each class of compounds contributes a specific property to the formulation that is advantageous to the success of the invention in yielding a reduced propensity for materials coated with the invention so treated to burn, smoke, generate toxic gases, or transmit heat.

Catalyst

The ingredients in the catalyst class preferably include but are not limited to phosphorous containing materials such as ammonium polyphosphate and tris (betachloroethyl) phosphate at approximately a 9:1 ratio. Under the influence of heat from a fire or otherwise, the catalyst decomposes, yielding phosphoric acid.

The reactive phosphoric acid produced by the breakdown of the catalyst compound reacts with both the amine function of melamine and the hydroxy function of the carbonific, as described below, to produce water, carbon dioxide, urea and ammonia. In addition, under the applied and generated heat, the organic components of the resin composite, as described below, are degraded, producing and contributing to an insulating layer of char. The term "char," as used throughout the specification and claims, is intended to mean the resulting layer or structure of the coating when it is exposed to fire, heat or smoke.

In other embodiments, the phosphate material includes but is not limited to ammonium polyphosphate, tris(betachloroethyl) phosphate, guanidine phosphate, urea phosphate, melamine phosphate, monoammonium phosphate, diammonium phosphate, and mixtures thereof.

Expandable Flake Graphite

In the preferred embodiment, the expansion ratio of the graphite crystal is preferably 100:1. Expandable flake graphite is produced by the chemical or electrolytic oxidation treatment of natural crystalline flake graphite. When exposed to rapid, intense heating, the expandable flake graphite expands to many times its original volume. Expansion and expanded density properties are dependent upon the source of the original graphite and the nature of the treatment. Exfoliation, e.g., the separation of flakes and layers, is affected by the sudden volume increase of graphite "compounds", e.g., compounds that are the result of the above mentioned treatment, trapped between the stacked layers of the graphite crystal. Particles of crystalline expandable graphite exfoliate with an increase in volume of between 40 and 300 times. This crystal expansion is parallel with the "C" crystallographic axis. As described herein, with this invention, other formula constituents retard the volume of expansion, converting the reactant structure to a very bulky structure that tends to cling to itself.

Carbonific

In the preferred embodiment, the primary ingredient of the carbonific class of material is dipentaerythritol or tripentaerythritol. The carbonific, when heated, produces a carbon char layer that insulates the underlying uncombusted resin and finished structure from greater thermal damage. It should be understood, that the resin itself, with which the flame retardant additive powder is mixed, can be a secondary source of carbon, and thus, also a carbonific. In the case where the resin decomposes to a carbon rich byproduct, the amount of primary carbonific can accordingly be adjusted downward when the resin is to be relied upon as a carbonific for the combustion process.

In other embodiments of the invention, the carbonific material includes but is not limited to dipentaerythritol, pentaerythritol, tripentaerythritol, polyurethane, phenol, triethylene glycol, resorcinol, inositol, sorbitol, dextrin, and starch.

Blowing Agent

The blowing agent comprises primarily melamine. Heat decomposition of the melamine produces ammonia, urea, water, carbon dioxide, etc. These gases swell and expand the volume of the forming carbonaceous char. This expansion produces a multi-cellular, swollen thermal char layer, which insulates the underlying substrate from additional heat.

In other embodiments, the heat activated blowing agent includes but is not limited to urea, butyl urea, benzene sulfonyl-hydrazide, melamine phosphate, melamine polyphosphate, melamine cyanurate, melamine borate, chloroparaffin, guanidine and glycine.

Cementitious Constituent

The cementitious constituent reacts in the presence of generated steam vapor. These compounds proceed through a hydration reaction and impart a cementitious, e.g., cement, characteristic to the carbonaceous structure as the surface swells. This cementitious characteristic limits the expansion of the graphite and imparts structural integrity to the carbon char layer.

This heat resistant inorganic material includes, but is not limited to, a mixture of suitable heat resistant cementitious compounds. In the preferred embodiment, the cementitious constituent is calcium aluminate cement, which undergoes a dissolution precipitation reaction when exposed to water or water steam vapor. In an alternative embodiment, silica flour may be used. Silica flour makes a contribution by working in concert with the cementitious constituent (e.g. calcium aluminate cement structure) by Van der Waals Forces.

Ceramic

The heat resistant ingredients of the ceramic class of materials are preferably solid ceramic, hollow ceramic or treated silica spheres, or a combination thereof. The preferred ceramic is made of spheres having a diameter of between approximately 10 and 500 microns.

Other embodiments include but are not limited to quartz, mica and other inorganic materials, which possess high emissivity values.

Adhesive Binder

Another constituent is an adhesive binder, which provides adherence of the fire-retarding and smoke-suppressing powder or composition to a material substrate. The adhesive binder is preferably either a resin that is synthetically produced or a naturally occurring film forming material (e.g. plant latex) having the property of coagulating when exposed to ambient air at room temperature.

In the preferred embodiment, the adhesive binder is a one-part, air dried, cross-linking polymer of modified unsold emulsion, including but not limited to styrenated unsold emulsion polymers containing unsaturated carboxylic groups that crosslink. An acrylic emulsion is a two phase liquid system where the latex polymer liquid is immiscible (e.g., dissolved) in water and dispersed uniformly throughout.

An alternate embodiment comprises an acrylic colloidal dispersion in the binder. The acrylic colloidal dispersion is a dense packing of solid sub-micron polymer particles, dispersed in water and alternately described as a suspension. The solid polymer particles are suspended and dispersed in water without dissolution in the water and without sedimentation. The colloid is coated with a hydrophilic membrane while suspended. Upon drying, the hydrophilic constituents on the particles evaporate, and the colloidal coalesce to a hydrophobic film.

Alternatively, the binder includes thermoset resins that require initiation to crosslink at ambient room temperature, or thermoset resins that require initiation to crosslink at elevated temperature.

The binder can also be a dispersion of a thermoplastic polymer, a thermosetting polymeric resin, or any film-forming polymeric resin capable of coalescing to a film. Non limiting examples of such polymers include aqueous dispersions of polyamide polymers, polyethylene polymers, polypropylene polymers, and certain polyester polymers. When coalescence at room temperature is desired, lower molecular weight oligomers of the above polymers may be employed, or traditional film-forming polymers such as polyester polymers, vinyl ester polymers, vinyl ester/ethylene copolymers, acrylate polymers, styrene/acrylate copolymers, styrene/butadiene copolymers, and a variety of natural and synthetic latexes and the like may be used.

The preferred thermosetting epoxy polymer is a Type I epoxy system although Type II epoxies are also useful in accordance with the invention. The preferred Type I systems are based on liquid epoxy resin wherein the dispersed resin particles contain both epoxy and curing agent. An amine curing agent preferably serves as the emulsifier for the epoxy and the emulsion is formed when these two components are mixed together. Type I systems can often be formulated to zero or essentially no volatile organic compounds (VOCs), primarily because liquid epoxy exhibits good handling, flow and coalescence without the aid of co-solvents. Type I systems preferably use amine curing agents to emulsify the liquid epoxy forming dispersed resin particles, which contain both epoxy and amine. Liquid epoxy (epoxide equivalent weight 190) is very rich in epoxide groups. The combination of concentrated epoxides and amine hydrogens in the same dispersed particle leads to very short pot lives. Liquid epoxy, with its short rigid backbone, yields cured coatings with high hardness but low flexibility and low impact resistance.

To overcome the limitations of liquid epoxy, waterborne systems based on high-molecular-weight solid epoxies have been developed, resulting in the more recent Type II technologies. Type II systems preferably use solid epoxy resin pre-dispersed in water and co-solvent. Solid epoxies are supplied pre-dispersed at 50-55% solids in water and co-solvent. To aid in processing and to overcome the poor flow and coalescence of solid epoxies, 5-10% glycol ether is preferably added to the dispersions thereby eliminating any possibility for zero or essentially no VOC formulations. In Type II systems, the dispersed resin particles contain only solid epoxy resin so that the curing agent migrates from the aqueous phase into the dispersed epoxy particles for reaction to occur. Type II systems offer the handling and performance benefits associated with solid epoxy resins. Dry times are very fast due to lacquer dry of the high viscosity epoxy. Flexibility is improved due to the more flexible backbone of solid epoxy. Pot life is much longer due to the lower concentration of epoxides and amine hydrogens, and also because amine must migrate from the aqueous phase into the dispersed epoxy particles before reaction can take place.

The principal weakness of Type II systems is their tendency to form heterogeneous films with epoxy rich and amine rich domains due to incomplete coalescence. Co-solvents and plasticizers are thus preferably added at levels of 100-250 g/liter to improve film formation and to extend pot life. During the pot life, as amine reacts with epoxy, the minimum film-forming temperature of the polymer keeps increasing until the film can no longer coalesce. The end of pot life is not signaled by a viscosity increase but rather by a loss of gloss or a loss of barrier properties.

The preferred thermosetting urethane polymer (e.g. polyurethane) is a Type VI urethane system although Types I and II urethanes, typically referred to as 1 part urethanes, are also useful in accordance with the invention. All six types of urethane systems can be used in accordance with the invention and are disclosed below.

The TYPE I urethane system is a one-component alkyd reacted with a polyisocyanate and offers greater toughness and abrasion resistance than do unmodified alkyds.

The Type II urethane system is one-component, has a polymer with unreacted isocyanate in the backbone, reacts and crosslinks upon application and exposure to moisture from the air, and is known as "moisture cure urethane."

The Type III urethane system is one-component and heat-cured polymer and contains isocyanate that is chemically blocked from reacting with hydrogen donors in the product, until the heating drives off the blocking agent.

The Type IV urethane system is a two-component polymer comprised of free isocyanate groups mixed at time of use with a catalyst of monomeric polyol or polyamine.

The Type V urethane system is a two-component polyisocyanate polymer mixed at time of use with a resin containing active hydrogen groups.

The Type VI urethane system is a one-component, unreactive urethane polymer in solvent solution which forms a film upon solvent evaporation, but otherwise does not change (crosslink).

The adhesive binder of the preferred embodiment is self-dispersing, but may be dispersed with the aid of solvent-based or aqueous-based materials such a solvent, dispersant, surfactant, or suspending agent material or combination thereof. The binder may also incorporate fibrous reinforcements, and is capable of wetting and coating glass rovings and woven glass rovings; threads, yarns and fabrics of both natural and synthetic materials and combinations thereof; non-woven fabrics; insulating assemblies; and combinations of said fabrics and insulating assemblies. Preferred synthetic fibers include but are not limited to glass, polyamide, and graphite. Preferred natural fibers include but are not limited to hemp, jute, sisal, cotton, and wool.

The film forming adhesive resin binder is preferably an aqueous, i.e., water, based polymer dispersion that contains only traces, or virtually, no volatile organic compounds (VOCs), or hazardous air pollutants (HAPs). Spraying, dipping, brushing, rolling-on or other means for applying the adhesive composition can accomplish application of the water-based composition.

In an alternative embodiment, the coating mixture, comprising the fire retardant and smoke suppressing composition and the binder, is processed with a foamer prior to application. The foamer whips air into the coating, forming air pockets or air cavities. After application of this coating, the coating dries on the substrate and the "foam" disappears or collapses.

Reaction to Heat Source

The invention is pyrolytic, e.g., undergoes chemical change caused by heat. Upon exposure to high heat, as in a fire, the active materials operate stepwise in the following orderly format:

In the earliest phase of the fire retardant activity reaction, the catalyst/initiator decomposes to release a strong acid by-product, whereupon the by-product dehydrates the pyrolysing adhesive binder resin and reacts with the carbonific to form initiator based esters. After a series of reactions and decompositions, the original acid by-product of the catalyst decomposition is released for further reaction to continue the above-described cycle. Unsaturated compounds are formed with subsequent charring. During this phase, the expandable crystalline graphite decomposes to form a matrix of elemental carbon platelets that hold the growing structure resulting from the catalyst reaction in place until the remaining functional groups contribute to a fire retarding and smoke suppressing layer. As the layer grows, particulate smoke and soot is entrapped within the carbon platelet matrix, reducing particulate smoke.

Reduced to an elemental carbon mass, the formed carbon platelet structure cannot make a contribution as a fuel source or generate smoke.

In unison with the graphite reaction, the catalyzed carbonific begins to decompose, as the temperature rises, along a much different route and at a lower temperature than would have occurred for a non-catalyzed carbonific. A functional component in the carbonific binds with the dehydrated acrylic binder to form a contributing carbonaceous quantity within the char. Additionally, decomposition of the carbonific constituents produces fire snuffing carbon dioxide and water. The original strong acid by-product of the catalyst decomposition continues to be regenerated for the reaction cycle to continue.

The blowing agent then begins to decompose, yielding non-flammable gases and additional char. The surface and volume of the resulting structure or char layer increases, forming a swollen insulative heat shield.

The cementitious constituents perform several functions as the structure develops, including adding rigidity and strength to the expanded carbon char; reflecting infrared (IR) radiances; and, suppressing smoke and afterglow.

The ceramic constituent, dispersed throughout and supported by the carbon/cementitious structure also performs several functions, including: insulating the under-laminate from heat; absorbing IR radiances; reradiating the IR away from the coated material by emissivity; and, in combination with the cementitious/char component structure, keeps even higher temperatures and high velocity pressure gradients from penetrating into the under-laminate structure.

EFFECT OF THE INVENTION

Upon application of the surface film coating to a combustible substrate, the invention substantially and sharply reduces the propensity of the coated substrate to combust, generate toxic smoke or transmit heat when exposed to open flame or high radiant heat. Upon exposure to fire, the coating will intumesce, e.g., swell, and form an open-cell, ceramic/graphite/cementitious barrier. This swollen structure dramatically shields the underlying substrate from an open flame or radiant heat source; it allows the substrate to withstand even higher temperatures and increased pressure gradients; and allows heat dissipation by atmospheric convection.

The invention is pliable after curing, and adheres to all common building material substrates, i.e., wood, steel, gypsum board, cement, tile, foam, fiberglass, and coated materials. Further, the invention is non-flammable and intumesces to produce a highly insulative layer; produces very little smoke upon exposure to open flame or high radiant heat; contains an aqueous based non-toxic polymer binder with no active toxic constituents; produces no significant toxic fumes upon combustion; contains no brominated compounds; contains cementitious, i.e., cement, constituents; contains exfoliating crystalline graphite; and, contains ceramic for increased emissivity.

Test Results

Standard testing methods and protocols are used by many authorities to determine fire-hazard and surface-burning characteristics of building materials, e.g., ASTM E-84 Standard Test Method for Surface Burning Characteristics of Building Materials. It is accepted that test results with higher values for flame spread and smoke obscuration are indicative of a greater fire hazard and more dangerous smoke production. Comparative results for the ASTM protocol are listed in Table A.

TABLE A

ASTM E-84 Test Results for a Coated Substrate

| Property | Invention | Typical Prior Art |
|---|---|---|
| Flame Spread Ratio | 15 | 25.0 |
| Smoke Obscuration | 100 | 980+ |
| Toxicity | None | High |

As seen from Table A, the flame spread ratio and smoke obscuration results for the invented material surpass, and in terms of life safety characteristics, are superior to that of a typical prior-art result. This is a significant reduction. More surprisingly and importantly, no toxic by-products are produced by the invented material and a significant amount of the registered obscuration is water, by chemical design.

Smoke obscuration measurement by the ASTM E-84 protocol is based upon the attenuation, i.e., change in concentration, of a white light beam by smoke accumulating in a chamber. Results are derived from measuring optical density as absorbance within the chamber. The photometric scale used to measure smoke by this method is similar to the optical density scale for human vision. Hence, obscuration can result from such combustion byproduct species as particulate matter, e.g., soot, or condensed gas, e.g., water vapor.

INDUSTRIAL APPLICABILITY

The invention is further illustrated by the following non-limiting examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above and/or in the attachments, and of the corresponding application(s), are hereby incorporated by reference.

What is claimed is:

1. A method of retarding fire and suppressing smoke with a coating comprising the following steps:
   providing an active coating on a substrate, the coating comprising an essentially non-toxic fire retardant and smoke suppressing composition comprising:
   a carbonific;
   a blowing agent;
   a catalyst;
   a ceramic;
   expandable graphite;
   a cementitious constituent; and
   an essentially non-toxic adhesive binder; and
   exposing the coating to fire or radiant heat, thereby causing the coating to intumesce and expand to a fire retarding and smoke suppressing char and causing the cementitious constituent to undergo a hydration reaction.

2. The method of claim 1 wherein upon reacting the coating to fire or radiant heat, the catalyst releases a by-product.

3. The method of claim 2 further comprising the step of the catalyst dehydrating the binder.

4. The method of claim 2 wherein
   the catalyst by-product reacts with the carbonific; and
   the catalyzed carbonific decomposes, forming a carbonaceous structure within the char layer and producing fire snuffing compounds.

5. The method of claim 4 wherein the catalyst by-product regenerates and repeats the steps of claim 4.

6. The method of claim 1 wherein
   the blowing agent decomposes, yielding non-flammable gases and additional char; and
   the char layer grows larger in volume forming a swollen insulative heat shield.

7. The method of claim 1 wherein the ceramic insulates the substrate from heat, absorbs infrared radiances, reradiates the infrared from the coating by emissivity, and keeps higher temperatures and high velocity pressure gradients from penetrating into the substrate.

8. The method of claim 1 wherein the expanding graphite increases the char volume.

9. The method of claim 1 wherein the composition does not comprise a brominated compound.

10. The method of claim 1 wherein the composition does not comprise a heavy metal compound.

11. The method of claim 1 wherein the composition comprises essentially no volatile organic compounds and virtually no hazardous air pollutants.

12. The method of claim 1 further comprising the steps of foaming the coating prior to application of the coating on the substrate and drying the coating, thereby eliminating the foam.

13. The method of claim 1 wherein the adhesive binder comprises a thermoplastic; and further comprising the step of casting or extruding the thermoplastic binder.

14. The method of claim 13 wherein the step of casting or extruding the thermoplastic binder comprises casting or extruding the thermoplastic binder in a film.

* * * * *